(12) United States Patent
Hanatani et al.

(10) Patent No.: US 10,762,066 B2
(45) Date of Patent: Sep. 1, 2020

(54) DATA PROCESSING SYSTEM HAVING AN INTEGRATION LAYER, AGGREGATION LAYER, AND ANALYSIS LAYER, DATA PROCESSING METHOD FOR THE SAME, PROGRAM FOR THE SAME, AND COMPUTER STORAGE MEDIUM FOR THE SAME

(71) Applicant: GIXO LTD., Tokyo (JP)

(72) Inventors: Shintaro Hanatani, Tokyo (JP); Tomohiro Amino, Tokyo (JP); Tagahiko Tanaka, Tokyo (JP)

(73) Assignee: GIXO LTD., Tokyo (JP)

( * ) Notice: Subject to any disclaimer, the term of this patent is extended or adjusted under 35 U.S.C. 154(b) by 320 days.

(21) Appl. No.: 15/559,115

(22) PCT Filed: Mar. 4, 2016

(86) PCT No.: PCT/JP2016/056744
§ 371 (c)(1),
(2) Date: Sep. 18, 2017

(87) PCT Pub. No.: WO2016/152455
PCT Pub. Date: Sep. 29, 2016

(65) Prior Publication Data
US 2018/0157687 A1 Jun. 7, 2018

(30) Foreign Application Priority Data
Mar. 24, 2015 (JP) .................. 2015-061321

(51) Int. Cl.
*G06F 16/21* (2019.01)
*G06F 16/28* (2019.01)
(Continued)

(52) U.S. Cl.
CPC .......... *G06F 16/217* (2019.01); *G06F 16/254* (2019.01); *G06F 16/283* (2019.01); *G06Q 10/00* (2013.01)

(58) Field of Classification Search
CPC ............................ G06F 16/217; G06F 16/283
(Continued)

(56) References Cited

U.S. PATENT DOCUMENTS

2004/0167870 A1    8/2004   Wakefield et al.
2004/0215656 A1   10/2004   Dill et al.
(Continued)

FOREIGN PATENT DOCUMENTS

JP      2006-509307 A    3/2006
JP         4598612 B2   12/2010
(Continued)

OTHER PUBLICATIONS

International Search Report of the International Searching Authority dated May 10, 2016 in corresponding international application No. PCT/JP2016/056744 (and English translation).
(Continued)

*Primary Examiner* — Robert W Beausoliel, Jr.
*Assistant Examiner* — Arthur Ganger
(74) *Attorney, Agent, or Firm* — Posz Law Group, PLC

(57) ABSTRACT

A database of a data processing system includes a data warehouse that stores all of input data that are input. In the data processing system, an integration layer stores an integrated data after the input data are integrated to generate the integrated data, and an aggregation layer stores aggregated data after the integrated data are aggregated by at least the number of addition items or the number of non-addition items for each of one or more combinations of the non-addition items to generate the aggregated data. An analysis layer stores an analysis data after one aggregated data is
(Continued)

selected from the aggregated data based on a condition necessary for generation of the analysis data set by a setting section. The analysis data are further extracted from the one aggregated data.

10 Claims, 11 Drawing Sheets

(51) Int. Cl.
 *G06F 16/25* (2019.01)
 *G06Q 10/00* (2012.01)
(58) Field of Classification Search
 USPC ......................................................... 707/600
 See application file for complete search history.

(56) References Cited

U.S. PATENT DOCUMENTS

| | | | | |
|---|---|---|---|---|
| 2005/0055329 | A1* | 3/2005 | Bakalash | G06F 16/2455 |
| 2008/0270363 | A1* | 10/2008 | Hunt | G06F 16/2462 |
| 2009/0271384 | A1* | 10/2009 | Bakalash | C03B 37/02718 |
| 2011/0295792 | A1* | 12/2011 | Mascarenhas | G06F 16/283 |
| | | | | 707/601 |
| 2011/0295837 | A1 | 12/2011 | Bolsius et al. | |
| 2011/0320399 | A1* | 12/2011 | Ledwich | G06F 16/254 |
| | | | | 707/602 |
| 2012/0005151 | A1* | 1/2012 | Vasudevan | G06F 16/283 |
| | | | | 707/600 |
| 2012/0173478 | A1* | 7/2012 | Jensen | G06F 16/283 |
| | | | | 707/602 |
| 2013/0124241 | A1* | 5/2013 | Yeung | G06Q 10/063 |
| | | | | 705/7.11 |

FOREIGN PATENT DOCUMENTS

| | | |
|---|---|---|
| JP | 2013-527540 A | 6/2013 |
| JP | 2013-531844 A | 8/2013 |

OTHER PUBLICATIONS

Extended EP Search Report dated Nov. 9, 2018 issued in corresponding EP patent application No. 16768358.0.

* cited by examiner

FIG.3

<RAW DATA STORED IN CAPTURE LAYER 30> ~311

POS DATA OF DECEMBER

| SALES DATE | SALES TIME | RECEIPT NUMBER | REGISTER NUMBER | PLU CODE | PRODUCT NAME | SALES UNIT PRICE | THE NUMBER OF SALES | MEMBER NUMBER |
|---|---|---|---|---|---|---|---|---|
| 2014/12/01 | 10:31 | 10000001 | 100 | 2018181199992 | GROUND BEEF | 392 | 1 | 12300001 |
| 2014/12/01 | 10:31 | 10000001 | 100 | 2018107699995 | RADISH | 100 | 2 | 12300001 |
| 2014/12/01 | 10:31 | 10000001 | 100 | 2018134499995 | ○○SOY SAUCE | 359 | 1 | 12300001 |
| 2014/12/01 | 10:34 | 10000002 | 200 | 2018183799992 | △△POTATO CHIPS | 129 | 1 | 12300301 |
| 2014/12/01 | 10:34 | 10000002 | 200 | 2018104499994 | ××RAMEN | 210 | 2 | 12300301 |
| 2014/12/01 | 10:36 | 10000003 | 100 | 2018107699991 | CUP ICE CREAM A | 139 | 1 | 12300017 |
| 2014/12/01 | 10:36 | 10000003 | 100 | 2018126899992 | ◇◇SNACK | 108 | 2 | 12300017 |

MEMBER MASTER DATA ~321

| MEMBER NUMBER | MEMBER NAME | BIRTHDAY | ADDRESS |
|---|---|---|---|
| 12300001 | MEMBER A | 19761201 | MINATO-KU, TOKYO |
| 12300017 | MEMBER B | 19800317 | ARAKAWA-KU, TOKYO |
| 12300301 | MEMBER C | 19901023 | KAWASAKI-SHI, KANAGAWA-KEN |
| 12300501 | MEMBER D | 19690910 | NERIMA-KU, TOKYO |
| 12300503 | MEMBER E | 19910624 | FUNABASHI-SHI, CHIBA-KEN |
| 12300504 | MEMBER F | 19810313 | MUSASHINO-SHI, TOKYO |

ADMISSION/WITHDRAWAL MASTER DATA ~322

| MEMBER NUMBER | ADMISSION DATE | WITHDRAWAL DATE |
|---|---|---|
| 12300001 | 2014/02/01 | |
| 12300017 | 2014/02/10 | |
| 12300301 | 2014/03/02 | |
| 12300501 | 2014/03/05 | |
| 12300503 | 2014/03/12 | 2014/12/10 |
| 12300504 | 2014/03/16 | |

PRODUCT MASTER DATA ~323

| PLU CODE | PRODUCT NAME | PRODUCT CATEGORY |
|---|---|---|
| 2018181199992 | GROUND BEEF | MEAT |
| 2018107699995 | RADISH | VEGETABLE |
| 2018134499995 | ○○SOY SAUCE | SEASONING |
| 2018183799992 | △△POTATO CHIPS | SNACK |
| 2018104499994 | ××RAMEN | INSTANT NOODLE |
| 2018107699991 | CUP ICE CREAM A | ICE CREAM |
| 2018126899992 | ◇◇SNACK | SNACK |
| 2018134699997 | CUP ICE CREAM C | ICE CREAM |
| 2018105699999 | YAKINIKU BOX LUNCH | BOX LUNCH・SIDE DISH |

FIG.4

<INPUT DATA STORED IN DATA WAREHOUSE 40>

POS DATA 411

| SALES DATE | SALES TIME | RECEIPT NUMBER | REGISTER NUMBER | PLU CODE | PRODUCT NAME | SALES UNIT PRICE | THE NUMBER OF SALES | MEMBER NUMBER |
|---|---|---|---|---|---|---|---|---|
| 2014/11/30 | 20:58 | 09001234 | 100 | 2018134699997 | CUP ICE CREAM C | 108 | 1 | 12300503 |
| 2014/11/30 | 20:58 | 09001234 | 100 | 2018105699999 | YAKINIKU BOX LUNCH | 498 | 1 | 12300503 |
| 2014/12/01 | 10:31 | 10000001 | 100 | 2018181199992 | GROUND BEEF | 392 | 1 | 12300001 |
| 2014/12/01 | 10:31 | 10000001 | 100 | 2018107699995 | RADISH | 100 | 2 | 12300001 |
| 2014/12/01 | 10:31 | 10000001 | 100 | 2018134499995 | ○○SOY SAUCE | 359 | 1 | 12300001 |
| 2014/12/01 | 10:34 | 10000002 | 200 | 2018183799992 | △△POTATO CHIPS | 129 | 1 | 12300301 |
| 2014/12/01 | 10:34 | 10000002 | 200 | 2018104499994 | ××RAMEN | 210 | 2 | 12300301 |
| 2014/12/01 | 10:36 | 10000003 | 100 | 2018107699991 | CUP ICE CREAM A | 139 | 1 | 12300017 |
| 2014/12/01 | 10:36 | 10000003 | 100 | 2018126899992 | ◇◇SNACK | 108 | 2 | 12300017 |

MEMBER MASTER DATA 421

| MEMBER NUMBER | MEMBER NAME | BIRTHDAY | ADDRESS |
|---|---|---|---|
| 12300001 | MEMBER A | 19761201 | MINATO-KU, TOKYO |
| 12300017 | MEMBER B | 19800317 | ARAKAWA-KU, TOKYO |
| 12300301 | MEMBER C | 19901023 | KAWASAKI-SHI, KANAGAWA-KEN |
| 12300501 | MEMBER D | 19690910 | NERIMA-KU, TOKYO |
| 12300503 | MEMBER E | 19910624 | FUNABASHI-SHI, CHIBA-KEN |
| 12300504 | MEMBER F | 19810313 | MUSASHINO-SHI, TOKYO |

ADMISSION/WITHDRAWAL MASTER DATA 422

| MEMBER NUMBER | ADMISSION DATE | WITHDRAWAL DATE |
|---|---|---|
| 12300001 | 2014/02/01 | |
| 12300017 | 2014/02/10 | |
| 12300301 | 2014/03/02 | |
| 12300501 | 2014/03/05 | |
| 12300503 | 2014/03/12 | 2014/12/10 |
| 12300504 | 2014/03/16 | |

PRODUCT MASTER DATA 423

| PLU CODE | PRODUCT NAME | PRODUCT CATEGORY |
|---|---|---|
| 2018181199992 | GROUND BEEF | MEAT |
| 2018107699995 | RADISH | VEGETABLE |
| 2018134499995 | ○○SOY SAUCE | SEASONING |
| 2018183799992 | △△POTATO CHIPS | SNACK |
| 2018104499994 | ××RAMEN | INSTANT NOODLE |
| 2018107699991 | CUP ICE CREAM A | ICE CREAM |
| 2018126899992 | ◇◇SNACK | SNACK |
| 2018134699997 | CUP ICE CREAM C | ICE CREAM |
| 2018105699999 | YAKINIKU BOX LUNCH | BOX LUNCH・SIDE DISH |

FIG. 5

<INTEGRATED DATA STORED IN INTEGRATION LAYER 50>

UNIVERSAL MEMBER MASTER DATA

| MEMBER NUMBER | MEMBER NAME | BIRTHDAY | ADDRESS | ADMISSION DATE | WITHDRAWAL DATE |
|---|---|---|---|---|---|
| 12300001 | MEMBER A | 19761201 | MINATO-KU, TOKYO | 2014/02/01 | |
| 12300017 | MEMBER B | 19800317 | ARAKAWA-KU, TOKYO | 2014/02/10 | |
| 12300301 | MEMBER C | 19901023 | KAWASAKI-SHI, KANAGAWA-KEN | 2014/03/02 | |
| 12300501 | MEMBER D | 19690910 | NERIMA-KU, TOKYO | 2014/03/05 | |
| 12300503 | MEMBER E | 19910624 | FUNABASHI-SHI, CHIBA-KEN | 2014/03/12 | 2014/12/10 |
| 12300504 | MEMBER F | 19810313 | MUSASHINO-SHI, TOKYO | 2014/03/16 | |

521

UNIVERSAL PRODUCT MASTER DATA

| PLU CODE | PRODUCT NAME | PRODUCT CATEGORY |
|---|---|---|
| 2018181199992 | GROUND BEEF | MEAT |
| 2018107699995 | RADISH | VEGETABLE |
| 2018134499995 | ○○SOY SAUCE | SEASONING |
| 2018183799992 | △△POTATO CHIPS | SNACK |
| 2018104499994 | ××RAMEN | INSTANT NOODLE |
| 2018107699991 | CUP ICE CREAM A | ICE CREAM |
| 2018126899992 | ◇◇SNACK | SNACK |
| 2018134699997 | CUP ICE CREAM C | ICE CREAM |
| 2018105699999 | YAKINIKU BOX LUNCH | BOX LUNCH · SIDE DISH |

522

UNIVERSAL POS DATA

| SALES DATE | SALES TIME | RECEIPT NUMBER | REGISTER NUMBER | PLU CODE | PRODUCT NAME | PRODUCT CATEGORY | SALES UNIT PRICE | THE NUMBER OF SALES | MEMBER NUMBER | MEMBER NAME | BIRTHDAY | ADDRESS | ADMISSION DATE | WITHDRAWAL DATE |
|---|---|---|---|---|---|---|---|---|---|---|---|---|---|---|
| 2014/11/30 | 20:58 | 09001234 | 100 | 2018134699997 | CUP ICE CREAM C | ICE CREAM | 108 | 1 | 12300503 | MEMBER E | 19910624 | FUNABASHI-SHI, CHIBA-KEN | 2014/03/12 | 2014/12/10 |
| 2014/11/30 | 20:58 | 09001234 | 100 | 2018105699999 | YAKINIKU BOX LUNCH | BOX LUNCH · SIDE DISH | 498 | 1 | 12300503 | MEMBER E | 19910624 | FUNABASHI-SHI, CHIBA-KEN | 2014/03/12 | 2014/12/10 |
| 2014/12/01 | 10:31 | 10000001 | 100 | 2018181199992 | GROUND BEEF | MEAT | 392 | 2 | 12300001 | MEMBER A | 19761201 | MINATO-KU, TOKYO | 2014/02/01 | |
| 2014/12/01 | 10:31 | 10000001 | 100 | 2018107699995 | RADISH | VEGETABLE | 160 | 1 | 12300001 | MEMBER A | 19761201 | MINATO-KU, TOKYO | 2014/02/01 | |
| 2014/12/01 | 10:31 | 10000001 | 100 | 2018134499995 | ○○SOY SAUCE | SEASONING | 359 | 1 | 12300001 | MEMBER A | 19761201 | MINATO-KU, TOKYO | 2014/02/01 | |
| 2014/12/01 | 10:34 | 10000002 | 200 | 2018183799992 | △△POTATO CHIPS | SNACK | 129 | 1 | 12300301 | MEMBER C | 19901023 | KAWASAKI-SHI, KANAGAWA-KEN | 2014/03/02 | |
| 2014/12/01 | 10:34 | 10000002 | 200 | 2018104499994 | ××RAMEN | INSTANT NOODLE | 210 | 2 | 12300301 | MEMBER C | 19901023 | KAWASAKI-SHI, KANAGAWA-KEN | 2014/03/02 | |
| 2014/12/01 | 10:36 | 10000003 | 100 | 2018107699991 | CUP ICE CREAM A | ICE CREAM | 139 | 1 | 12300017 | MEMBER B | 19800317 | ARAKAWA-KU, TOKYO | 2014/02/10 | |
| 2014/12/01 | 10:36 | 10000003 | 100 | 2018126899992 | ◇◇SNACK | SNACK | 108 | 2 | 12300017 | MEMBER B | 19800317 | ARAKAWA-KU, TOKYO | 2014/02/10 | |

<AGGREGATED DATA STORED IN AGGREGATION LAYER 60>

AGGREGATION IN RECEIPT UNIT — 601

| SALES YEAR/MONTH | RECEIPT NUMBER | THE TOTAL NUMBER OF SALES | TOTAL SALES AMOUNT |
|---|---|---|---|
| 2014/11 | 09001234 | 3 | 355 |
| 2014/12 | 10000001 | 4 | 951 |
| 2014/12 | 10000002 | 3 | 549 |
| 2014/12 | 10000003 | 3 | 355 |

AGGREGATION IN PRODUCT CATEGORY UNIT — 602

| SALES YEAR/MONTH | PRODUCT CATEGORY | THE NUMBER OF RECEIPTS | THE TOTAL NUMBER OF SALES | TOTAL SALES AMOUNT |
|---|---|---|---|---|
| 2014/11 | ICE CREAM | 632 | 1,030 | 138,041 |
| 2014/11 | BOX LUNCH · SIDE DISH | 1,197 | 1,436 | 571,687 |
| 2014/11 | MEAT | 1,798 | 4,315 | 1,009,757 |
| 2014/11 | VEGETABLE | 2,201 | 7,263 | 1,089,495 |
| 2014/11 | SEASONING | 398 | 438 | 136,594 |
| 2014/11 | SNACK | 797 | 1,355 | 149,039 |
| 2014/11 | INSTANT NOODLE | 786 | 1,493 | 295,693 |
| 2014/12 | ICE CREAM | 512 | 835 | 111,831 |
| 2014/12 | BOX LUNCH · SIDE DISH | 1,236 | 1,483 | 590,314 |
| 2014/12 | MEAT | 1,687 | 4,049 | 947,419 |
| 2014/12 | VEGETABLE | 2,374 | 7,834 | 1,175,130 |
| 2014/12 | SEASONING | 476 | 524 | 163,363 |
| 2014/12 | SNACK | 987 | 1,678 | 184,569 |
| 2014/12 | INSTANT NOODLE | 750 | 1,425 | 282,150 |

AGGREGATION IN MEMBER UNIT — 603

| SALES YEAR/MONTH | MEMBER NUMBER | THE NUMBER OF RECEIPTS | THE TOTAL NUMBER OF SALES | TOTAL SALES AMOUNT |
|---|---|---|---|---|
| 2014/11 | 12300001 | 21 | 107 | 14,351 |
| 2014/11 | 12300017 | 17 | 71 | 9,925 |
| 2014/11 | 12300301 | 8 | 30 | 4,203 |
| 2014/11 | 12300501 | 11 | 39 | 7,200 |
| 2014/11 | 12300503 | 23 | 71 | 12,050 |
| 2014/11 | 12300504 | 2 | 5 | 1,604 |
| 2014/12 | 12300001 | 20 | 102 | 13,668 |
| 2014/12 | 12300017 | 19 | 80 | 11,092 |
| 2014/12 | 12300301 | 5 | 19 | 2,627 |
| 2014/12 | 12300501 | 10 | 35 | 6,545 |
| 2014/12 | 12300503 | 22 | 68 | 11,526 |
| 2014/12 | 12300504 | 8 | 22 | 6,415 |

MEAN SALES UNIT PRICE IN PRODUCT CATEGORY AND PLU CODE UNIT — 604

| SALES YEAR/MONTH | PRODUCT CATEGORY | PLU CODE | MEAN SALES UNIT PRICE |
|---|---|---|---|
| 2014/11 | ICE CREAM | 2018134699997 | 107 |
| 2014/11 | ICE CREAM | 2018107699991 | 130 |
| 2014/11 | ICE CREAM | 2018107699994 | 176 |
| 2014/11 | ICE CREAM | 2018107199997 | 82 |
| 2014/11 | SNACK | 2018183799992 | 127 |
| 2014/11 | SNACK | 2018126899992 | 105 |
| 2014/11 | SNACK | 2018126599998 | 54 |
| 2014/11 | SNACK | 2018118799991 | 199 |
| 2014/12 | ICE CREAM | 2018134699997 | 108 |
| 2014/12 | ICE CREAM | 2018107699991 | 139 |
| 2014/12 | ICE CREAM | 2018107699994 | 156 |
| 2014/12 | ICE CREAM | 2018107199997 | 82 |
| 2014/12 | SNACK | 2018183799992 | 129 |
| 2014/12 | SNACK | 2018126899992 | 108 |
| 2014/12 | SNACK | 2018126599998 | 52 |
| 2014/12 | SNACK | 2018118799991 | 198 |

THE NUMBER OF MEMBERS IN ADDRESS UNIT — 605

| ADDRESS | THE NUMBER OF MEMBERS |
|---|---|
| MINATO-KU, TOKYO | 21 |
| ARAKAWA-KU, TOKYO | 67 |
| NERIMA-KU, TOKYO | 10 |
| MUSASHINO-SHI, TOKYO | 11 |
| KAWASAKI-SHI, KANAGAWA-KEN | 3 |
| FUNABASHI-SHI, CHIBA-KEN | 13 |

FIG.7

<ANALYSIS DATA STORED IN ANALYSIS LAYER 70>

AGGREGATION IN RECEIPT UNIT OF DECEMBER

| RECEIPT NUMBER | THE TOTAL NUMBER OF SALES | TOTAL SALES |
|---|---|---|
| 10000001 | 4 | 951 |
| 10000002 | 3 | 549 |
| 10000003 | 3 | 355 |

~701

AGGREGATION IN PRODUCT CATEGORY UNIT OF DECEMBER

| PRODUCT CATEGORY | THE NUMBER OF RECEIPTS | THE TOTAL NUMBER OF SALES | TOTAL SALES AMOUNT |
|---|---|---|---|
| ICE CREAM | 512 | 835 | 111,831 |
| BOX LUNCH · SIDE DISH | 1,236 | 1,483 | 590,314 |
| MEAT | 1,687 | 4,049 | 947,419 |
| VEGETABLE | 2,374 | 7,834 | 1,175,130 |
| SEASONING | 476 | 524 | 163,363 |
| SNACK | 987 | 1,678 | 184,569 |
| INSTANT NOODLE | 750 | 1,425 | 282,150 |

~702

AGGREGATION IN MEMBER UNIT OF DECEMBER

| MEMBER NUMBER | THE NUMBER OF RECEIPTS | THE TOTAL NUMBER OF SALES | TOTAL SALES AMOUNT |
|---|---|---|---|
| 12300001 | 20 | 102 | 13,668 |
| 12300017 | 19 | 80 | 11,092 |
| 12300301 | 5 | 19 | 2,627 |
| 12300501 | 10 | 35 | 6,545 |
| 12300503 | 22 | 68 | 11,526 |
| 12300504 | 8 | 22 | 6,415 |

~703

MEAN SALES UNIT PRICE IN PRODUCT CATEGORY AND PLU CODE UNIT OF DECEMBER

| PRODUCT CATEGORY | PLU CODE | MEAN SALES UNIT PRICE |
|---|---|---|
| ICE CREAM | 2018134699997 | 108 |
| ICE CREAM | 2018107699991 | 139 |
| ICE CREAM | 2018107699994 | 156 |
| ICE CREAM | 2018107199997 | 82 |
| SNACK | 2018183799992 | 129 |
| SNACK | 2018126899992 | 108 |
| SNACK | 2018126599998 | 52 |
| SNACK | 2018118799991 | 198 |

⟨INTEGRATED DATA TO WHICH ATTRIBUTE DATA IS ADDED⟩

UNIVERSAL MEMBER MASTER DATA ~521a

| MEMBER NUMBER | MEMBER NAME | BIRTHDAY | ADDRESS | ADMISSION DATE | WITHDRAWAL DATE | MEMBER CATEGORY |
|---|---|---|---|---|---|---|
| 12300001 | MEMBER A | 19761201 | MINATO-KU, TOKYO | 2014/02/01 | | EXCELLENT MEMBER |
| 12300017 | MEMBER B | 19800317 | ARAKAWA-KU, TOKYO | 2014/02/10 | | EXCELLENT MEMBER |
| 12300301 | MEMBER C | 19901023 | KAWASAKI-SHI, KANAGAWA-KEN | 2014/03/02 | | GENERAL MEMBER |
| 12300501 | MEMBER D | 19690910 | NERIMA-KU, TOKYO | 2014/03/05 | | ASSOCIATE EXCELLENT MEMBER |
| 12300503 | MEMBER E | 19910624 | FUNABASHI-SHI, CHIBA-KEN | 2014/03/12 | 2014/12/10 | EXCELLENT MEMBER |
| 12300504 | MEMBER F | 19810313 | MUSASHINO-SHI, TOKYO | 2014/03/16 | | ASSOCIATE EXCELLENT MEMBER |

UNIVERSAL PRODUCT MASTER DATA ~522a

| PLU CODE | PRODUCT NAME | PRODUCT CATEGORY | PRODUCT RANK CATEGORY |
|---|---|---|---|
| 2018161199992 | GROUND BEEF | MEAT | MEDIUM-QUALITY PRODUCT |
| 2018107699995 | RADISH | VEGETABLE | POPULAR PRODUCT |
| 2018134499995 | ○○SOY SAUCE | SEASONING | MEDIUM-QUALITY PRODUCT |
| 2018183799992 | △△POTATO CHIPS | SNACK | MEDIUM-QUALITY PRODUCT |
| 2018104499994 | ××RAMEN | INSTANT NOODLE | MEDIUM-QUALITY PRODUCT |
| 2018107699991 | CUP ICE CREAM A | ICE CREAM | MEDIUM-QUALITY PRODUCT |
| 2018126899992 | ◇◇SNACK | SNACK | POPULAR PRODUCT |
| 2018134699997 | CUP ICE CREAM C | ICE CREAM | POPULAR PRODUCT |
| 2018105699999 | YAKINIKU BOX LUNCH | BOX LUNCH・SIDE DISH | HIGH-QUALITY PRODUCT |

UNIVERSAL POS DATA ~511a

| SALES DATE | SALES TIME | RECEIPT NUMBER | REGISTER NUMBER | PLU CODE | PRODUCT NAME | PRODUCT CATEGORY | PRODUCT RANK CATEGORY | SALES UNIT PRICE | THE NUMBER OF SALES | MEMBER NUMBER | MEMBER NAME | BIRTHDAY | ADDRESS | ADMISSION DATE | WITHDRAWAL DATE | MEMBER CATEGORY |
|---|---|---|---|---|---|---|---|---|---|---|---|---|---|---|---|---|
| 2014/11/30 | 20:58 | 09001234 | 100 | 2018134699997 | CUP ICE CREAM C | ICE CREAM | POPULAR PRODUCT | 108 | 1 | 12300503 | MEMBER E | 19910624 | FUNABASHI-SHI, CHIBA-KEN | 2014/03/12 | 2014/12/10 | EXCELLENT MEMBER |
| 2014/11/30 | 20:58 | 09001234 | 100 | 2018105699999 | YAKINIKU BOX LUNCH | BOX LUNCH・SIDE DISH | HIGH-QUALITY PRODUCT | 486 | 1 | 12300503 | MEMBER E | 19910624 | FUNABASHI-SHI, CHIBA-KEN | 2014/03/12 | 2014/12/10 | EXCELLENT MEMBER |
| 2014/12/01 | 10:31 | 10000001 | 100 | 2018161199992 | GROUND BEEF | MEAT | MEDIUM-QUALITY PRODUCT | 392 | 1 | 12300001 | MEMBER A | 19761201 | MINATO-KU, TOKYO | 2014/02/01 | | EXCELLENT MEMBER |
| 2014/12/01 | 10:31 | 10000001 | 100 | 2018107699995 | RADISH | VEGETABLE | POPULAR PRODUCT | 100 | 2 | 12300001 | MEMBER A | 19761201 | MINATO-KU, TOKYO | 2014/02/01 | | EXCELLENT MEMBER |
| 2014/12/01 | 10:31 | 10000001 | 100 | 2018134499995 | ○○SOY SAUCE | SEASONING | MEDIUM-QUALITY PRODUCT | 358 | 1 | 12300001 | MEMBER A | 19761201 | MINATO-KU, TOKYO | 2014/02/01 | | EXCELLENT MEMBER |
| 2014/12/01 | 10:34 | 10000002 | 200 | 2018183799992 | △△POTATO CHIPS | SNACK | MEDIUM-QUALITY PRODUCT | 129 | 1 | 12300301 | MEMBER C | 19901023 | KAWASAKI-SHI, KANAGAWA-KEN | 2014/03/02 | | GENERAL MEMBER |
| 2014/12/01 | 10:34 | 10000002 | 200 | 2018104499994 | ××RAMEN | INSTANT NOODLE | MEDIUM-QUALITY PRODUCT | 210 | 2 | 12300301 | MEMBER C | 19901023 | KAWASAKI-SHI, KANAGAWA-KEN | 2014/03/02 | | GENERAL MEMBER |
| 2014/12/01 | 10:36 | 10000003 | 100 | 2018107699991 | CUP ICE CREAM A | ICE CREAM | MEDIUM-QUALITY PRODUCT | 139 | 1 | 12300017 | MEMBER B | 19800317 | ARAKAWA-KU, TOKYO | 2014/02/10 | | EXCELLENT MEMBER |
| 2014/12/01 | 10:36 | 10000003 | 100 | 2018126899992 | ◇◇SNACK | SNACK | POPULAR PRODUCT | 108 | 2 | 12300017 | MEMBER B | 19800317 | ARAKAWA-KU, TOKYO | 2014/02/10 | | EXCELLENT MEMBER |

FIG.11

<INTEGRATED DATA TO WHICH ATTRIBUTE DATA IS ADDED>

UNIVERSAL MEMBER MASTER DATA 521b

| MEMBER NUMBER | MEMBER NAME | BIRTHDAY | AGE | AGE GROUP | ADDRESS | ADMISSION DATE | WITHDRAWAL DATE | MEMBER PERIOD (MONTH) | WITHDRAWAL FLAG |
|---|---|---|---|---|---|---|---|---|---|
| 12300001 | MEMBER A | 19761201 | 38 | THIRTIES | MINATO-KU, TOKYO | 2014/02/01 | | 10 | |
| 12300017 | MEMBER B | 19800317 | 34 | THIRTIES | ARAKAWA-KU, TOKYO | 2014/02/10 | | 10 | |
| 12300301 | MEMBER C | 19901023 | 24 | TWENTIES | KAWASAKI-SHI, KANAGAWA-KEN | 2014/03/02 | | 9 | |
| 12300501 | MEMBER D | 19690910 | 46 | FORTIES | NERIMA-KU, TOKYO | 2014/03/05 | | 9 | |
| 12300503 | MEMBER E | 19910624 | 23 | TWENTIES | FUNABASHI-SHI, CHIBA-KEN | 2014/03/12 | 2014/12/10 | 9 | 1 |
| 12300504 | MEMBER F | 19810313 | 33 | THIRTIES | MUSASHINO-SHI, TOKYO | 2014/03/16 | | 9 | |

UNIVERSAL POS DATA 511b

| SALES DATE | SALES TIME | RECEIPT NUMBER | REGISTER NUMBER | PLU CODE | PRODUCT NAME | PRODUCT CATEGORY | SALES UNIT PRICE | THE NUMBER OF SALES | MEMBER NUMBER | MEMBER NAME | BIRTHDAY | AGE | AGE GROUP | ADDRESS | ADMISSION DATE | WITHDRAWAL DATE | MEMBER PERIOD (MONTH) | WITHDRAWAL FLAG |
|---|---|---|---|---|---|---|---|---|---|---|---|---|---|---|---|---|---|---|
| 2014/11/30 | 20:56 | 09001234 | 100 | 2018134699997 | CUP ICE CREAM C | ICE CREAM | 108 | 1 | 12300503 | MEMBER E | 19910624 | 23 | TWENTIES | FUNABASHI-SHI, CHIBA-KEN | 2014/03/12 | 2014/12/10 | 9 | 1 |
| 2014/11/30 | 20:56 | 09001234 | 100 | 2018105699999 | YAKINIKU BOX LUNCH | BOX LUNCH · SIDE DISH | 498 | 1 | 12300503 | MEMBER E | 19910624 | 23 | TWENTIES | FUNABASHI-SHI, CHIBA-KEN | 2014/03/12 | 2014/12/10 | 9 | 1 |
| 2014/12/01 | 10:31 | 10000001 | 100 | 2018107599992 | GROUND BEEF | MEAT | 392 | 1 | 12300201 | MEMBER A | 19761201 | 38 | THIRTIES | MINATO-KU, TOKYO | 2014/02/01 | | 10 | |
| 2014/12/01 | 10:31 | 10000001 | 100 | 2018107599995 | RADISH | VEGETABLE | 100 | 2 | 12300201 | MEMBER A | 19761201 | 38 | THIRTIES | MINATO-KU, TOKYO | 2014/02/01 | | 10 | |
| 2014/12/01 | 10:34 | 10000002 | 200 | 2018134499995 | COSCY SAUCE | SEASONING | 359 | 1 | 12300301 | MEMBER C | 19901023 | 24 | TWENTIES | KAWASAKI-SHI, KANAGAWA-KEN | 2014/03/02 | | 9 | |
| 2014/12/01 | 10:34 | 10000002 | 200 | 2018182799992 | △△POTATO CHIPS | SNACK | 129 | 1 | 12300301 | MEMBER C | 19901023 | 24 | TWENTIES | KAWASAKI-SHI, KANAGAWA-KEN | 2014/03/02 | | 9 | |
| 2014/12/01 | 10:34 | 10000002 | 200 | 2018104499994 | × × RAMEN | INSTANT NOODLE | 210 | 2 | 12300301 | MEMBER C | 19901023 | 24 | TWENTIES | KAWASAKI-SHI, KANAGAWA-KEN | 2014/03/02 | | 9 | |
| 2014/12/01 | 10:36 | 10000003 | 100 | 2018107699991 | CUP ICE CREAM A | ICE CREAM | 139 | 1 | 12300017 | MEMBER B | 19800317 | 34 | THIRTIES | ARAKAWA-KU, TOKYO | 2014/02/10 | | 10 | |
| 2014/12/01 | 10:36 | 10000003 | 100 | 2018126599992 | ◇◇SNACK | SNACK | 108 | 2 | 12300017 | MEMBER B | 19800317 | 34 | THIRTIES | ARAKAWA-KU, TOKYO | 2014/02/10 | | 10 | |

DATA PROCESSING SYSTEM HAVING AN INTEGRATION LAYER, AGGREGATION LAYER, AND ANALYSIS LAYER, DATA PROCESSING METHOD FOR THE SAME, PROGRAM FOR THE SAME, AND COMPUTER STORAGE MEDIUM FOR THE SAME

CROSS-REFERENCE TO RELATED APPLICATION

This application is a U.S. national stage application of PCT/JP2016/056744 filed on Mar. 4, 2016, and is based on Japanese Patent Application No. 2015-061321 filed on Mar. 24, 2015, the disclosures of which are incorporated by reference.

TECHNICAL FIELD

The present invention relates to a data processing system for processing input data to generate analysis data, a data processing method using the data processing system, a program, and a computer storage medium.

BACKGROUND ART

Conventionally, to analyze a large amount of data accumulated in a time series and allow the analyzed data to be used for management, a data warehouse that stores the large amount of data has been used. If the data warehouse is used, various analyses can be performed from a large amount of data. However, for example, if the analyses are performed from data in units of hundreds of millions of rows, a processing load on the computer is large and processing time is long. For this reason, a data mart created by selecting or aggregating only information necessary for the analysis from the data warehouse has also been used.

In the case of using a system including such a data warehouse or a data mart, there is a problem that, for example, if a data flow in the system is changed, it is necessary to remarkably modify the existing system or construct a new system.

For example, Patent Literature 1 discloses a database server that includes databases having a hierarchical structure and performs data processing between the databases of the respective layers to flexibly cope with the change in the data flow. That is, the database server is configured to include a storage section for storing databases and a processing section for inputting, processing, and outputting data between the databases. The storage section has a hierarchical structure, and includes an interface layer database that registers data input from the processing section, a data warehouse layer database that registers data, to which attributes are assigned, in the data registered in the interface layer database, a work layer database that registers rate-converted data in the data registered in the data warehouse layer database, and a data mart layer database that registers data processed according to a use method in the data registered in the work layer database.

CITATION LIST

Patent Literature

Patent Literature 1: JP 4598612 B2

SUMMARY OF INVENTION

Technical Problem

In recent societies that are changing in every moment, various analyses are required. However, the database server (hereinafter, referred to as the conventional database server) described in Patent Literature 1 assumes the change in the data flow in the server, but do not assume the change in the required analysis, that is, the change in the output data.

In the conventional database server, the databases of each layer are designed after it is set what kind of analyses is to be performed in advance. By doing so, the data processed and output by the conventional database server can be used for a specific analysis, but cannot be used for other analyses. In other words, the conventional database server has to change the design of the database according to the change in the required data. Accordingly, since the conventional database server cannot flexibly cope with the change in the analysis, there is room for improvement in the conventional database server.

An object of the present invention is to freely perform data processing in response to a change in a required analysis.

Solution to Problem

In order to achieve the object, the present invention is a data processing system processing input data to generate a data for analysis, and the data processing system includes: a storage section configured to store a database; a processing section configured to process data stored in the database; and a setting section configured to set a condition required to generate the data for analysis, wherein the database includes: a data warehouse configured to store all of input data that are input; an integration layer configured to store an integrated data after the processing section integrates the input data to generate the integrated data; an aggregation layer configured to store a plurality of aggregated data after the processing section aggregates the integrated data by at least the number of addition items or the number of non-addition items for each of one or more combinations of the non-addition items to generate the plurality of aggregated data; and an analysis layer configured to store an analysis data after the processing section selects one aggregated data from the plurality of aggregated data based on the condition set by the setting section and further extracts the analysis data from the one aggregated data. It should be noted that to aggregate the number of addition items, in addition to the aggregation of the number of addition items themselves, the aggregation of the number calculated using the addition items is also included.

According to the present invention, integrated data are generated by integrating input data stored in a data warehouse. Since data of all items of the input data are combined in the integrated data, versatility of the data is high. Thereafter, the integrated data are aggregated for each combination of one or more non-addition items to generate aggregated data. Since the aggregated data also include all combinations of non-addition items, versatility of the aggregated data is high. By using the aggregated data with the high versatility as described above, no matter what kind of analysis the required analysis is, that is, no matter what kinds of conditions the conditions set by a setting section are, it is possible to extract analysis data from the aggregated data based on that conditions. Therefore, according to the data processing system of the present invention, it is possible to freely perform the data processing in response to the change in the required analysis and output various analysis data in response to the change in the analysis.

In addition, since all input data are stored in the data warehouse, for example, even if the currently unnecessary data are required later due to the change in the analysis or the like, it is possible to promptly respond thereto.

Here, it is conceivable to directly extract the analysis data from the integrated data without generating the aggregated data as in the present invention. However, if the input data stored in the data warehouse exist in large amount, i.e., the input data are so-called big data, the integrated data are also big data. In this case, if the analysis data are directly extracted from the integrated data, the processing load on the computer is large and the processing speed becomes slow. In contrast, according to the present invention, it is possible to greatly reduce the processing load by extracting the analysis data from the aggregated data of smaller capacity than the integrated data. Therefore, the present invention is particularly useful for a large amount of data processing.

The input data may have a transaction input data and a master input data, the integrated data may have a transaction integration data and a master integration data, the processing section may integrate the master input data to generate the master integration data, and the processing section may integrate the transaction input data and the master integration data to generate the transaction integration data.

The data warehouse may further store an attribute data obtained from an analysis result of the analysis data, and the processing section may integrate the input data and further add the attribute data to generate the integrated data.

The processing section may perform the processing to extract the analysis data from the plurality of aggregated data a predetermined number of times and then delete an aggregated data that is not selected for generating the analysis data among the plurality of aggregated data from the aggregation layer.

Another aspect of the present invention is a data processing method for processing an input data to generate a data for analysis using a data processing system. The data processing system includes: a storage section configured to store a database including a data warehouse, an integration layer, an aggregation layer, and an analysis layer; a processing section configured to process a data stored in the database; and a setting section configured to set a condition required to generate the data for analysis. The data processing method includes: a first step of storing all of input data that are input, in the data warehouse; a second step of storing an integrated data in the integration layer after the processing section integrates the input data to generate the integrated data; a third step of storing a plurality of aggregated data in the aggregation layer after the processing section aggregates the integrated data by at least the number of addition items or the number of non-addition items for each of one or more combinations of the non-addition items to generate the plurality of aggregated data; and a fourth step of storing an analysis data in the analysis layer after the processing section selects one aggregated data from the plurality of aggregated data based on the condition set by the setting section and further extracts the analysis data from the one aggregated data.

The input data may have a transaction input data and a master input data, the integrated data may have a transaction integration data and a master integration data, and in the second step, the processing section may integrate the master input data to generate the master integration data, and the processing section may integrate the transaction input data and the master integration data to generate the transaction integration data.

The data processing method further includes: after the fourth step, a fifth step of storing an attribute data obtained from an analysis result of the analysis data in the data warehouse. In the second step, the processing section may integrate the input data and further add the attribute data to generate the integrated data.

After the fourth step is performed a predetermined number of times, the processing section may delete an aggregated data that is not selected for generating the analysis data among the plurality of aggregated data from the aggregation layer.

According to still another aspect of the present invention, there is provided a program operated on a computer controlling a data processing system to allow the data processing system to perform the data processing method.

According to yet another aspect of the present invention, there is provided a computer readable storage medium storing the program.

Advantageous Effects of Invention

According to the present invention, it is possible to freely perform the data processing in response to the change in the required analysis, and it is possible to output various analysis data in response to the change of the analysis.

BRIEF DESCRIPTION OF DRAWINGS

FIG. 3 is a diagram illustrating an example of raw data stored in a capture layer.

FIG. 4 is a diagram illustrating an example of input data stored in a data warehouse.

FIG. 5 is a diagram illustrating an example of integrated data stored in an integration layer.

FIG. 6 is a diagram illustrating an example of aggregated data stored in an aggregation layer.

FIG. 7 is a diagram illustrating an example of analysis data stored in an analysis layer.

FIG. 10 is a diagram illustrating an example of integrated data stored in an integration layer according to another embodiment of the present invention.

FIG. 11 is a diagram illustrating an example of integrated data stored in an integration layer according to another embodiment of the present invention.

DESCRIPTION OF EMBODIMENTS

Figure 1:
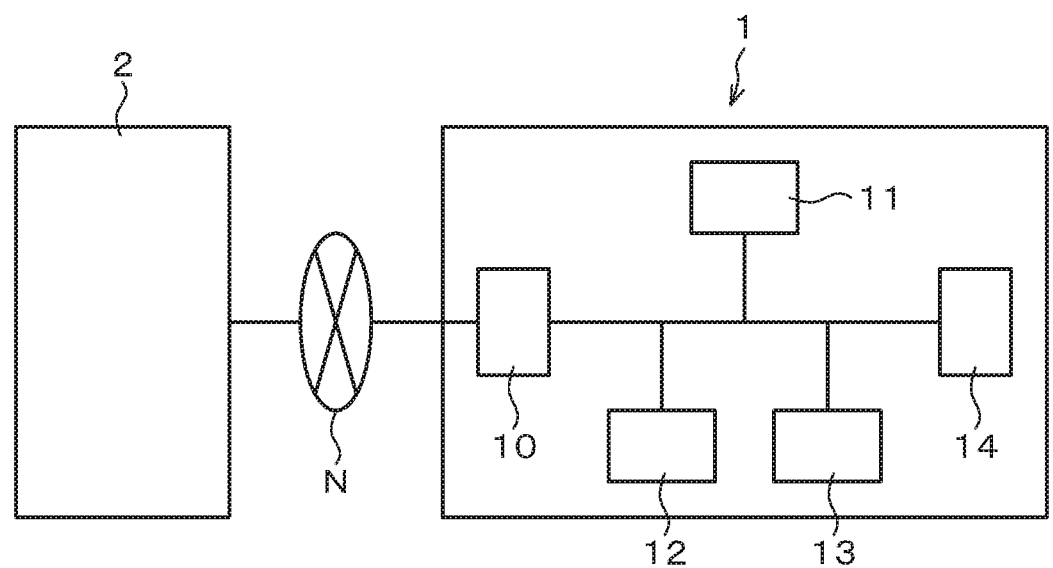
FIG. 1 is an explanatory diagram schematically illustrating a configuration of a data processing system according to an embodiment of the present invention.

Embodiments of the present invention will now be described with reference to the accompanying drawings. It should be noted that like elements having substantially the same functions in the present specification and drawings are denoted by like reference numerals and a redundant description thereof will be omitted.

1. Configuration of Data Processing System

FIG. 1 schematically illustrates a configuration of a data processing system 1 according to an embodiment of the present invention. The data processing system 1 is connected to an external system 2 via a network N. The data processing system 1 processes data (hereinafter, referred to as input data) input from the external system 2 to the data processing system 1 to generate data for analysis (hereinafter, referred to as analysis data). It should be noted that the network N is not particularly limited as long as it is capable of performing communication between the data processing system 1 and the external system 2, but may be, for example, the Internet, a wired LAN, a wireless LAN, or the like.

The data processing system 1 includes a communication section 10, a storage section 11, a processing section 12, a setting section 13, and an output section 14.

The communication section 10 is a communication interface that mediates communication with the network N, and performs data communication with the external system 2.

The storage section 11 stores a database of data to be processed by the data processing system 1. The database has hierarchical architecture, and the database stores each data that is generated in stages until the analysis data are generated from the input data. The configuration of the database will be described later. In addition, the storage section 11 also stores conditions set by the setting section 13 to be described later.

The processing section 12 processes the data stored in the database of the storage section 11. That is, the processing section 12 processes the input data in stages to generate analysis data.

The setting section 13 sets conditions necessary for data processing to generate necessary analysis data according to a desired analysis. This condition is set from the setting section 13 by an analyst and stored in the storage section 11.

The output section 14 outputs the analysis data stored in the database of the storage section 11 to the outside of the data processing system 1.

It should be noted that the component of the data processing system 1 illustrated in FIG. 1 can be configured to include a circuit (hardware) or a central processing unit such as a CPU, and a program (software) for causing them to function. The program controls each section 10 to 14 to perform data processing to be described later. In this case, the program can be stored in computer readable storage media of, for example, a computer readable hard disk (HD), a flexible disk (FD), a compact disk (CD), a magnet optical disc (MO), various memories, etc. In addition, the program can be downloaded via a communication network such as the Internet to be stored in the above-mentioned storage media.

2. Configuration of Database

Figure 2:
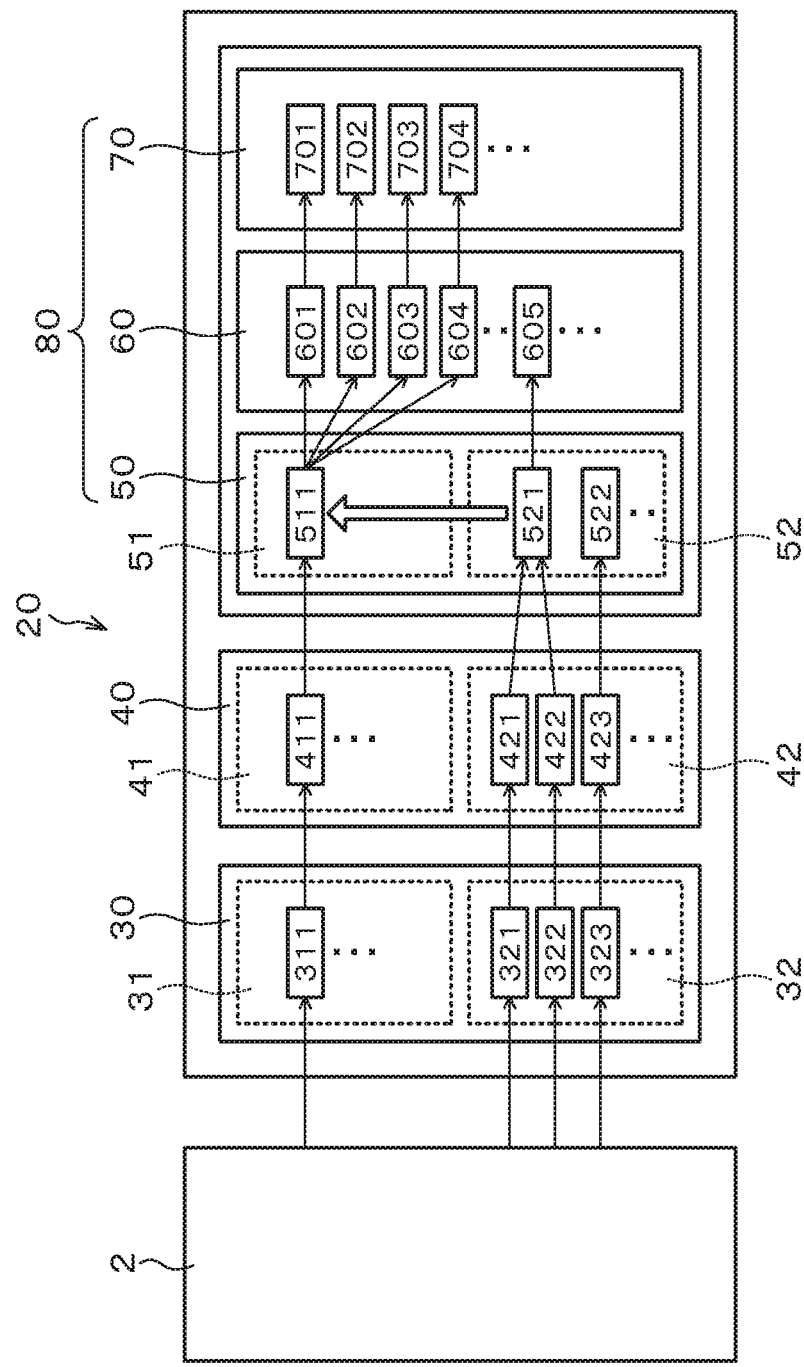
FIG. 2 is an explanatory diagram schematically illustrating a configuration of a database according to an embodiment of the present invention.

FIG. 2 schematically illustrates the configuration of the database 20 stored in the storage section 11. The database 20 includes a capture layer 30, a data warehouse 40, an integration layer 50, an aggregation layer 60, and an analysis layer 70. Among those, the integration layer 50, the aggregation layer 60, and the analysis layer 70 configure a data mart 80.

Various data subjected to predetermined processing by the processing section 12 are stored in each layer of the database 20. The capture layer 30 temporarily stores all raw data input from the external system 2, and the data warehouse 40 stores input data obtained by processing raw data of the capture layer 30. Therefore, the data warehouse 40 stores all input data from the external system 2. The integration layer 50 stores integrated data obtained by integrating the input data of the data warehouse 40, the aggregation layer 60 stores aggregated data obtained by aggregating the integrated data of the integration layer 50 for each predetermined item, and the analysis layer 70 stores the analysis data extracted from the aggregated data of the aggregation layer 60.

3. Data Processing Method

Next, the data processing performed using the data processing system 1 configured as described above will be described below. In the following description, a case in which the external system 2 is a database system that is installed in a retail store such as a supermarket (for example, chain stores which are distributed nationwide) and the data processing system 1 processes data acquired by the retail store will be described by way of example.

Above all, the data of the external system 2 are input to the data processing system 1 via the network N and the communication section 10. When the data from the external system 2 are registered in, for example, a table as they are, they may not be appropriately processed by SQL such as aggregation. For example, if unnecessary commas are included in the number of sales of the data, the commas are treated as a character, such that they cannot be summed up in the aggregation process. Therefore, the data input to the data processing system 1 are temporarily captured in the capture layer 30 of the database 20, and the processing section 12 performs cleansing processing such as excluding the commas described above. The raw data arranged in the table are stored in the capture layer 30.

The raw data stored in the capture layer 30 include transaction raw data of a transaction system and master raw data of a master system, and the capture layer 30 has a transaction raw data group 31 and a master raw data group 32. FIG. 3 illustrates an example of raw data after the cleansing. The transaction raw data 311 is a part of POS data of December. The transaction raw data 311 includes the number of sales as an addition item, and other items are non-addition items. Master raw data 321 to 323 are a part of member master data of a retail store, a part of member's admission/withdrawal master data, and a part of product master data, respectively. All the items included in the master raw data 321 to 323 are non-addition items.

Next, the processing section 12 processes the raw data 311 and 321 to 323 of the capture layer 30 to generate input data and stores the input data in the data warehouse 40. The input data include transaction input data and master input data, and the data warehouse 40 includes a transaction input data group 41 and a master input data group 42.

FIG. 4 illustrates an example of the input data. A plurality of transaction raw data 311 are sequentially captured in the capture layer 30, and the capture layer 30 accumulates these transaction raw data 311 to generate a transaction input data 411. That is, the transaction input data 411 is a part of the POS data of the whole period accumulated in a time series. A plurality of master raw data 321 to 323 are sequentially captured in the capture layer 30, and master input data 421 to 423 updated by the plurality of master raw data 321 to 323 are each generated.

Next, the processing section 12 integrates the input data 411 and 421 to 423 of the data warehouse 40 to generate integrated data, and stores the integrated data in the integration layer 50. The integrated data include transaction integration data and a master integration data, and the integration layer 50 includes a transaction integration data group 51 and a master integration data group 52.

FIG. 5 illustrates an example of the integrated data. Above all, master input data are integrated to generate master integration data. That is, the master input data 421 and 422 of a member system are integrated to generate a master integration data 521. The master integration data 521 is a member master data with high versatility in which all data of member systems are integrated. In addition, since the number of master input data 423 of a product system is one in the present embodiment, the master input data 423 is generated as a master integration data 522. The master integration data 522 is a product master data with high versatility in which all data of product systems are integrated.

Subsequently, the transaction input data 411 and the master integration data 521 and 522 are integrated to generate the transaction integration data 511. The transaction integration data 511 is a data obtained by integrating all of the transaction data and the master data, and are POS data having high versatility.

Next, the processing section 12 aggregates the integration data 511, 521, and 522 of the integration layer 50 by at least the number of addition items or non-addition items for each of one or more combinations of non-addition items to generate aggregated data, and stores the aggregated data in the aggregation layer 60. For example, the transaction integration data 511 has 14 non-addition items and 1 addition item, and the aggregated data are generated for all combinations. Thus, since the aggregated data include all combinations of non-addition items, versatility of the aggregated data is high. In addition, to aggregate the addition items and the number of addition items, in addition to the aggregation of the number of addition items themselves, the aggregation of the number calculated using the addition items is also included. Specifically, in the present embodiment, in addition to aggregating the number of sales which is an additional item, the aggregation of a sales amount and a mean sales unit price that are calculated from the number of sales and the unit price of sales is also included. It should be noted that the calculation of the sales amount and the mean sales unit price is previously programmed in the data processing system 1.

FIG. 6 illustrates an example of the aggregated data. Aggregated data 601 to 604 are obtained by aggregating the transaction integration data 511 for each predetermined item. The aggregated data 601 is obtained by aggregating a receipt unit (non-addition items), and the total number of sales and a total sales amount (the number of addition items) are aggregated. The aggregated data 602 and 603 are each obtained by aggregating a product category unit and a member unit (non-addition item), and the number of receipts (the number of non-addition items), the total number of sales, and the total sales amount (the number of addition items) are aggregated. The aggregated data 604 is obtained by aggregating a product category and a PLU code unit (non-addition items), and the mean sales unit price (the number of addition items) is aggregated.

In addition, an aggregated data 605 is obtained by aggregating the master integration data 521 for each predetermined item. That is, the aggregated data 605 is obtained by aggregating an address unit (non-addition item), and the number of members (the number of non-addition items) is aggregated. It should be noted that the aggregated data 605 may be generated from the transaction integration data 511.

Up to this point, in the data processing system 1, the processing for generating the aggregated data 601 to 605 from the raw data 311 and 321 to 323 is automatically performed.

Next, when the analysis data are generated from the aggregated data 601 to 605, conditions manually set by an analyst are used. That is, since the analyst obtains necessary analysis data according to a desired analysis, he/she sets the conditions when the analysis data are extracted from the aggregated data. The processing section 12 selects one aggregated data from the plurality of aggregated data 601 to 605 based on the conditions set by the setting section 13, and also extracts the analysis data from the one aggregated data. The analysis data are stored in the analysis layer 70.

FIG. 7 illustrates an example of the analysis data. In the present embodiment, the setting section 13 selects the aggregated data 601 to 604, and sets the conditions for extracting data of December of each aggregated data 601 to 604. Analysis data 701 to 704 are generated. It should be noted that depending on the conditions set by the analyst, the aggregated data may be used as the analysis data as they are, and in such a case, aggregated data and analysis data are the same.

The analysis data 701 to 704 are output from the output section 14 to the outside of the data processing system 1. The analyst performs the desired analysis based on the analysis data 701 to 704. At this time, the analyst performs the analysis using the existing analysis tool (for example, BI tool), but the analysis data 701 to 704 are sufficiently small up to capacity that can be handled by the analysis tool.

According to the embodiment described above, the integrated data of the integration layer 50 and the aggregated data of the aggregation layer 60 each have high versatility. For this reason, no matter what kind of analyses the required analyses are, that is, no matter what kind of conditions the conditions set by the setting section 13 are, the analysis data can be extracted from the aggregated data based on those conditions. Therefore, it is possible to freely perform the data processing in response to the change in the required analysis, and it is possible to output various analysis data in response to the change of the analysis. In other words, it is possible to conduct analyses that can be maximally utilized for management based on various analysis data.

In addition, since all input data are stored in the data warehouse 40, for example, even if the currently unnecessary data are required later due to the change in the analysis axis or the like, it is possible to promptly respond thereto.

In addition, if the input data of the data warehouse 40 are so-called big data, the integrated data are also big data. In this case, for example, if the analysis data are directly extracted from the integrated data as before, the processing load on the computer is large and the processing speed becomes slow. In this respect, in the present embodiment, it is possible to greatly reduce the processing load by extracting the analysis data from the aggregated data having a smaller capacity than the integrated data. Therefore, the present embodiment is particularly useful for a large amount of data processing.

4. Other Embodiments

Hereinafter, other embodiments of the present invention will be described. In the following description, parts overlapping with the above embodiments will not be described.

4-1. Other Embodiments

Figure 8:
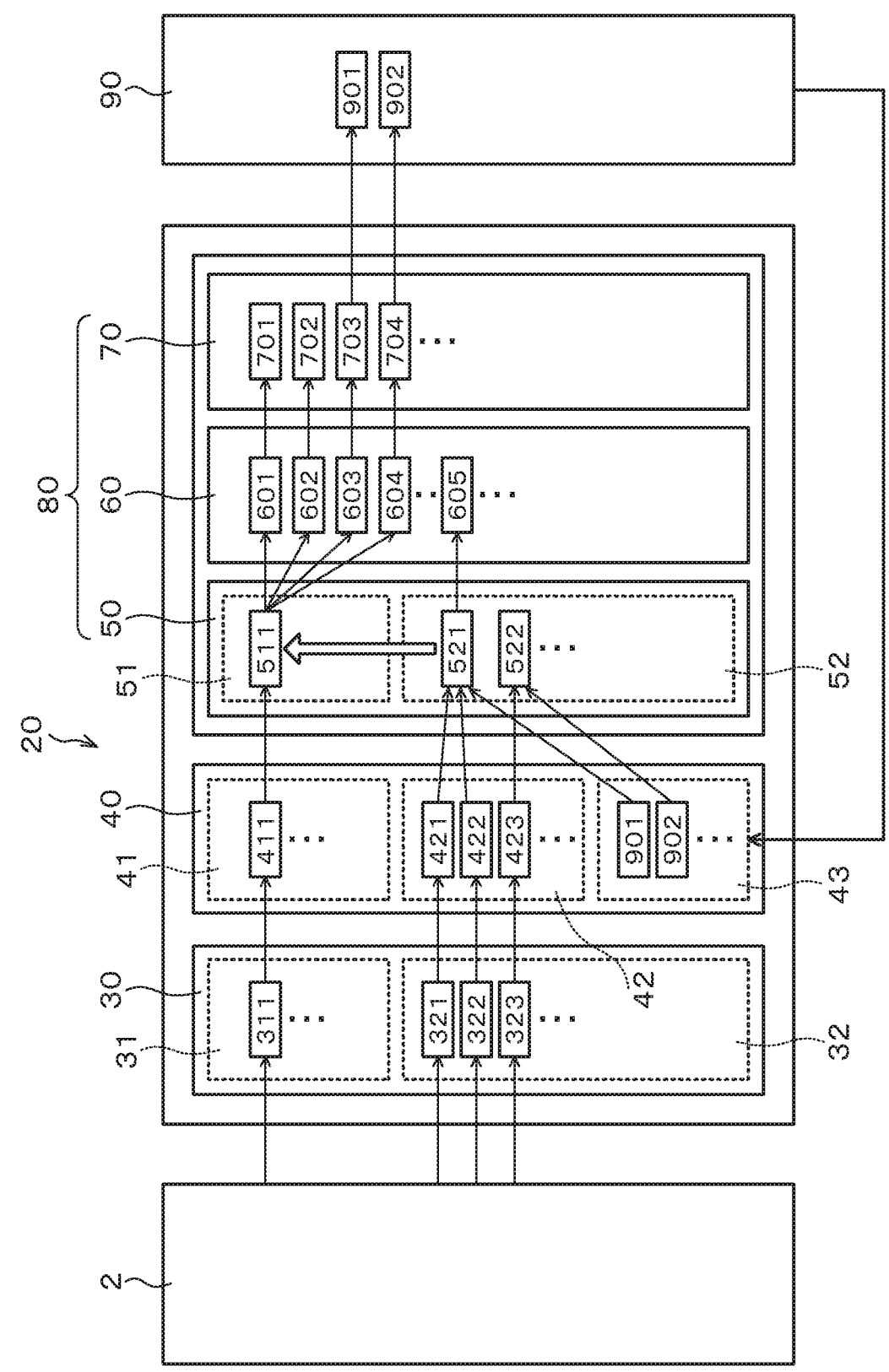
FIG. 8 is an explanatory diagram schematically illustrating a configuration of a database according to another embodiment of the present invention.
Figure 9:
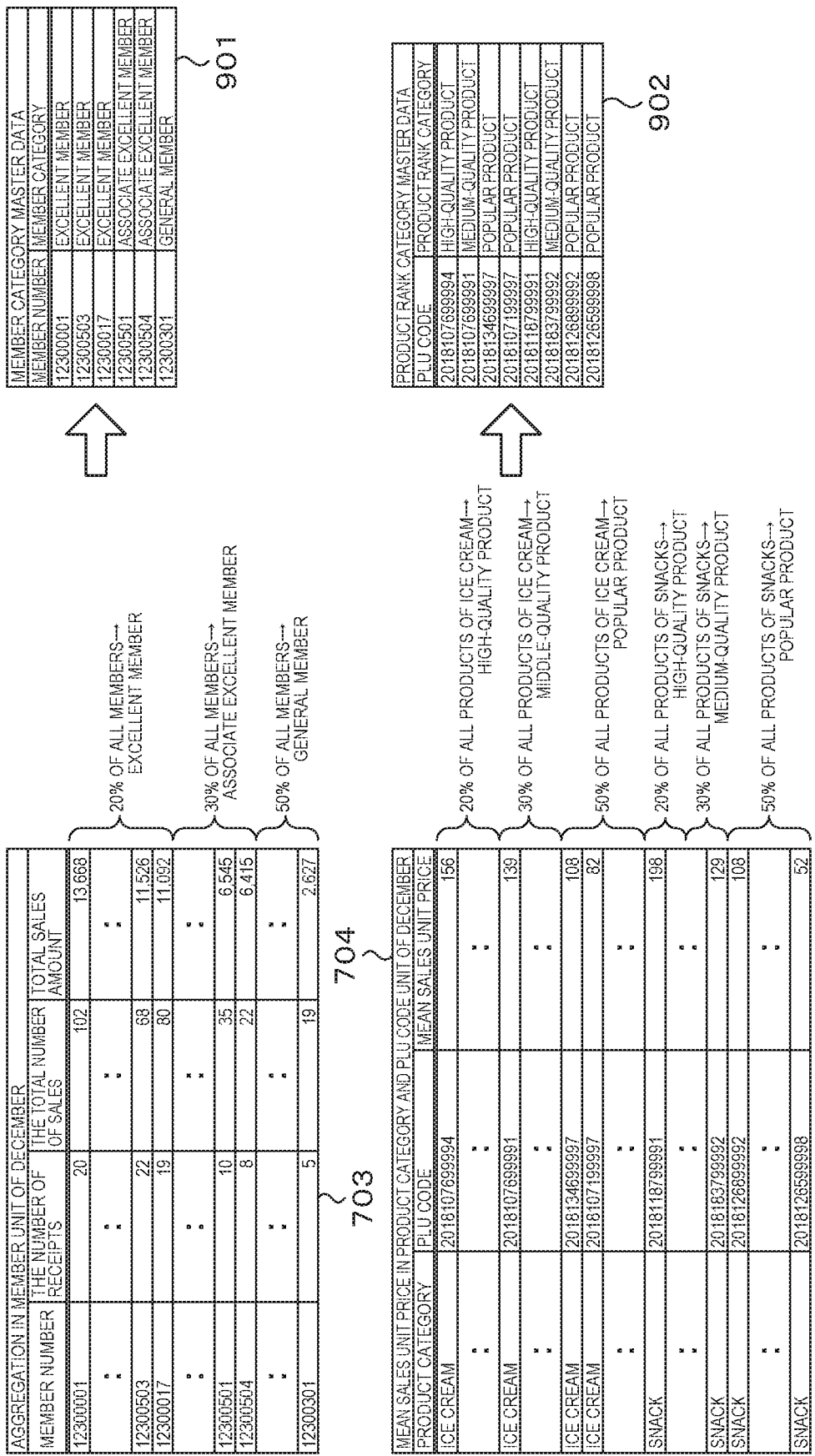
FIG. 9 is an explanatory diagram illustrating an aspect in which an analyst performs a desired analysis based on analysis data.

In the above embodiments, an analysis result 90 by an analyst as illustrated in FIG. 8 may be fed back to the database 20 of the data processing system 1. FIG. 9 is a diagram illustrating an aspect in which the analyst performs the desired analysis based on the analysis data output from the data processing system 1.

For example, in an analysis data 703, all the members are sorted in order of the total sales amount from the largest to smallest, in which the top 20% of all members is analyzed as an excellent member, the next 30% is analyzed as an associate excellent member, and the remaining 50% is analyzed as a general member. From the analysis result, an attribute data 901 which is a member category master data in which a member number and a member category correspond to each other is generated.

In addition, for example, in the analysis data 704, sorting is made in order of the mean sales unit price for each product category from the largest to smallest, in which the top 20% of all products is analyzed as high-quality product, the next 30% is analyzed as a middle-quality product, and the remaining 50% is analyzed as a popular product. From the analysis result, an attribute data 902 which is a product rank category master data in which the PLU code and the product rank category correspond to each other is generated. The attribute data 901 and 902 thus obtained are stored in an attribute data group 43 of the data warehouse 40 as illustrated in FIG. 8.

When the data processing system 1 performs the data processing, the attribute data 901 of the member system is added to the master integration data 521 of the same member system, and an integration data 521a illustrated in FIG. 10 is generated. In addition, the attribute data 902 of the product system is added to the master integration data 522 of the same product system, and a master integration data 522a is generated. These master integration data 521a and 522a are integrated into the transaction integration data 511, and a transaction integration data 511a is generated.

Since the data stored in the database 20 evolves in this way, for example, even if the analysis axis changes according to a change in products handled at a retail store or a change in society, it is possible to flexibly cope with the change to perform an appropriate analysis.

In the present embodiment, the attribute data are generated from the analysis data. In this regard, depending on the conditions set by the analyst using the setting section 13 as described above, the aggregated data are used as the analysis data as they are, and there may be the case in which the aggregated data and the analysis data may be the same. However, in this case, the attribute data are substantially generated from the aggregated data.

In addition, as another example of the attribute data, there are, for example, an age and an age group calculated from a member's birthday, a member period calculated from an admission date and a withdrawal date, and a withdrawal flag acquired from the withdrawal date, or the like. The attribute data are added to the master integration data 521, and a master integration data 521b is generated as illustrated in FIG. 11. A master integration data 521b is integrated into the transaction integration data 511, and a transaction integration data 511b is generated.

4-2. Other Embodiments

In the above embodiments, after the processing of extracting the analysis data of the analysis layer 70 from the plurality of aggregated data of the aggregation layer 60 is performed a predetermined number of times, the aggregated data that is not selected for generating the analysis data among the plurality of aggregated data may be deleted from the aggregation layer 60. If the analysis is performed a predetermined number of times, the analysis request of the analyst is patterned. The most efficient aggregated data that can immediately correspond to the pattern is stored in the aggregation layer 60.

In this case, the number of aggregated data stored in the aggregation layer 60 is reduced, the analysis data can be extracted more efficiently. In addition, the required capacity of the aggregation layer 60 can be reduced. It should be noted that the predetermined number of times to extract the analysis data from the aggregated data is not particularly limited, but can be arbitrarily selected.

4-3. Other Embodiments

The data stored in the database 20 are not limited to the above embodiments. Log data such as an access log may be stored in the transaction raw data group 31 of the capture layer 30, such that log data may be stored in the transaction input data group 41 of the data warehouse 40 and the transaction integration data group 51 of the integration layer 50. In addition, store data of a chain store or employee data may be stored in the master raw data group 32 of the capture layer 30, such that the store data or the employee data may also be stored in the master input data group 42 of the data warehouse 40 and the master integration data group 52 of the integration layer 50. Furthermore, attribute data of a store system or an employee system may also be stored in the attribute data group 43 of the data warehouse 40.

In addition, the transaction raw data 311 includes the number of sales as the addition item, and the aggregated data 601 includes, as the aggregation of the number calculated using the addition items, the sales amount calculated from the number of sales and the sales unit price are included. In this regard, the transaction raw data 311 may include the sales amount. In this case, when the aggregated data 601 is generated, there is no need to calculate the sales amount from the number of sales and the sales unit price. The raw data stored in the capture layer 30 in this way can optionally include the addition items and the non-addition items, and the aggregated data of the aggregation layer 60 are generated according to these items.

In addition, in the above-described embodiment, the data processing system 1 processes the data acquired by the retail store, but the data processing object is not limited thereto. The data processing system 1 of the present invention can process arbitrary data which includes an ID for identifying members or the like and in which a history associated with the ID remains, for example, usage data of a credit card, usage data of an EC site, usage data of a game, usage data of a public transportation or the like.

Hereinabove, although the exemplary embodiments of the present invention have been described with reference to the accompanying drawings, the present invention is not limited thereto. It will be apparent to those skilled in the art that modifications and variations could be made without departing from the scope of the present invention as defined by the appended claims. Therefore, it should be interpreted that all spirits equivalent to the following claims fall within the technical scope of the present invention.

INDUSTRIAL APPLICABILITY

The present invention is useful, for example, when data are processed to generate data for analysis, and in particular, is useful to process and analyze big data.

REFERENCE SIGNS LIST

1 Data processing system
2 External system
10 Communication section
11 Storage section
12 Processing section
13 Setting section
14 Output section
20 Database
30 Capture layer
31 Transaction raw data group
32 Master raw data group
40 Data warehouse
41 Transaction input data group
42 Master input data group
43 Attribute data group
50 Integration layer
51 Transaction integration data group
52 Master integration data group
60 Aggregation layer
70 Analysis layer
80 Data mart
90 Analysis result
311, 321 to 323 Raw data
411, 421 to 423 Input data
511, 521, 522 Integrated data
601 to 605 Aggregated data
701 to 704 Analysis data
901, 902 Attribute data
N Network

The invention claimed is:

1. A data processing system processing input data to generate a data for analysis, comprising:
a storage configured to store a database;
a circuit or hardware processor configured to:
process data stored in the database;
store, in a data warehouse included in the database, all of input data that are input;
integrate the input data to generate integrated data, and store in the database, as an integration layer, the integrated data;
aggregate the integrated data by at least a number of addition items or a number of non-addition items for each of one or more combinations of the non-addition items to generate a plurality of aggregated data, and store in the database the plurality of aggregated data as an aggregation layer;
receive a condition required to select the data for extraction and analysis, the condition being manually set by a user;
and using the condition manually set by the user, select one aggregated data from the plurality of aggregated data based on the condition set by the circuit or hardware processor, extract an analysis data from the one aggregated data that was selected,
and store the analysis data in the analysis layer of the database;
and wherein the circuit or hardware processor is further configured to perform processing to extract the analysis data from the plurality of aggregated data a predetermined plural number of times as a patterned analysis request and then delete, from the aggregation layer, an aggregated data that is not selected for generating the analysis data among the plurality of aggregated data.

2. The data processing system according to claim 1,
wherein the input data has a transaction input data and a master input data,
wherein the integrated data has a transaction integration data and a master integration data,
wherein the circuit or hardware processor is further configured to
integrate the master input data to generate the master integration data, and
integrate the transaction input data and the master integration data to generate the transaction integration data.

3. The data processing system according to claim 1,
wherein the circuit or hardware processor is further configured to
store, in the data warehouse, an attribute data obtained from an analysis result of the analysis data, and
integrate the input data and further add the attribute data to generate the integrated data.

4. A data processing method for processing an input data to generate a data for analysis using a data processing system, the data processing system including:
a storage configured to store a database including a data warehouse, an integration layer, an aggregation layer, and an analysis layer;
and a circuit or hardware processor configured to:
process a data stored in the database;
the data processing method comprising, by the circuit or hardware processor: a first step of storing all of input data that are input, in the data warehouse included in the database;
a second step of integrating the input data to generate integrated data, and storing in the database the integrated data in the integration layer;
a third step of aggregating the integrated data by at least a number of addition items or a number of non-addition items for each of one or more combinations of the non-addition items to generate a plurality of aggregated data, and storing in the database the plurality of aggregated data as an aggregation layer;
a step of receiving a condition required to select the data for extraction and analysis, the condition being manually set by a user: and a fourth step of, using the condition manually set by the user, selecting one aggregated data from the plurality of aggregated data;
extracting the analysis data from the one aggregated data that was selected, and storing the analysis data in the analysis layer of the database;
wherein after the fourth step is performed a predetermined plural number of times as a patterned analysis request, the circuit or hardware processor deleting from the aggregation layer, an aggregated data that is not selected for generating the analysis data among the plurality of aggregated data.

5. The data processing method according to claim 4,
wherein the input data has a transaction input data and a master input data,
wherein the integrated data has a transaction integration data and a master integration data, and
wherein, in the second step, the circuit or hardware processor integrating the master input data to generate the master integration data, and the circuit or hardware processor integrating the transaction input data and the master integration data to generate the transaction integration data.

6. The data processing method according to claim 4, further comprising:
    after the fourth step, a fifth step of storing an attribute data obtained from an analysis result of the analysis data in the data warehouse,
    wherein in the second step, the circuit or hardware processor integrating the input data and further adding the attribute data to generate the integrated data.

7. A program operated on a computer controlling a data processing system to allow the data processing system to perform the data processing method according to claim 4.

8. A non-transitory computer readable storage medium storing a program operated on a computer controlling a data processing system to allow the data processing system to perform a data processing method for processing an input data to generate a data for analysis, the data processing system including:
    a storage configured to store a database including a data warehouse, an integration layer, an aggregation layer, and an analysis layer;
    and a circuit or hardware processor configured to process a data stored in the database;
    the data processing method comprising: a first step of storing all of input data that are input, in the data warehouse included in the database; a second step of integrating the input data to generate integrated data, and storing in the database the integrated data in the integration layer; a third step of aggregating the integrated data by at least a number of addition items or a number of non-addition items for each of one or more combinations of the 6 non-addition items to generate a plurality of aggregated data, and storing in the database the plurality of aggregated data as an aggregation layer;
    a step of receiving a condition required to select the data for extraction and analysis, the condition being manually set by a user; and a fourth step of, using the condition manually set by the user, selecting one aggregated data from the plurality of aggregated data;
    extracting the analysis data from the one aggregated data that was selected, and storing the analysis data in the analysis layer of the database;
    wherein after the fourth step is performed a predetermined plural number of times as a patterned analysis request, the circuit or hardware processor deleting, from the aggregation layer, an aggregated data that is not selected for generating the analysis data among the plurality of aggregated data.

9. The non-transitory computer readable storage medium according to claim 8,
    wherein the input data has a transaction input data and a master input data,
    wherein the integrated data has a transaction integration data and a master integration data, and
    wherein, in the second step, the circuit or hardware processor integrating the master input data to generate the master integration data, and
    the circuit or hardware processor integrating the transaction input data and the master integration data to generate the transaction integration data.

10. The non-transitory computer readable storage medium according to claim 8, further comprising:
    after the fourth step, a fifth step of storing an attribute data obtained from an analysis result of the analysis data in the data warehouse,
    wherein in the second step, the circuit or hardware processor integrating the input data and further adding the attribute data to generate the integrated data.

* * * * *